United States Patent [19]

Uttenthaler

[11] Patent Number: 5,174,597
[45] Date of Patent: Dec. 29, 1992

[54] DAMPING ARRANGEMENT FOR THE JOINT OF AN ARTICULATED OMNIBUS

[75] Inventor: Josef Uttenthaler, Hettenshausen, Fed. Rep. of Germany

[73] Assignee: Man Nutzfahrzeuge A.G., Munich, Fed. Rep. of Germany

[21] Appl. No.: 661,653

[22] Filed: Feb. 27, 1991

[30] Foreign Application Priority Data

Mar. 10, 1990 [DE] Fed. Rep. of Germany ....... 4007684

[51] Int. Cl.⁵ .......................... B60D 1/32; B62D 53/04
[52] U.S. Cl. ................................... 280/432; 180/134;
   180/135; 180/139; 180/235; 280/446.1; 280/492
[58] Field of Search ............... 180/135, 134, 139, 235; 280/432, 446.1, 492

[56] References Cited

U.S. PATENT DOCUMENTS

| | | | |
|---|---|---|---|
| 2,843,417 | 7/1958 | Wahl et al. | 105/3 |
| 2,896,734 | 7/1959 | Toth | 180/139 |
| 3,176,801 | 4/1965 | Huff | 188/299 |
| 3,661,427 | 6/1972 | Hodge | 303/116 |
| 3,877,347 | 4/1975 | Sheesley et al. | 188/313 X |
| 4,106,792 | 8/1978 | Schultz | 280/432 |
| 4,310,061 | 1/1982 | Khanna et al. | 180/139 |
| 4,355,849 | 10/1982 | Wilson | 303/116 |
| 4,365,685 | 12/1982 | Ratsko et al. | 180/135 |
| 4,564,176 | 1/1986 | Schnetz | 267/64.11 |
| 4,588,171 | 5/1986 | Stephens | 188/318 X |
| 4,616,841 | 10/1986 | Reichl et al. | 280/432 |
| 4,655,440 | 4/1987 | Eckert | 188/314 X |
| 4,681,335 | 7/1987 | Ledermann et al. | 280/446.1 |
| 4,688,818 | 8/1987 | Grassmuck | 280/432 |
| 4,697,526 | 10/1987 | Vigliani | 280/403 X |
| 4,756,543 | 7/1988 | Cromnow et al. | 280/432 |
| 4,786,034 | 11/1988 | Heess et al. | 188/314 X |
| 4,819,770 | 4/1989 | Hahn | 188/322.19 X |
| 4,890,684 | 1/1990 | Simmons | 180/135 |

FOREIGN PATENT DOCUMENTS

| | | | |
|---|---|---|---|
| 1191847 | 4/1965 | Fed. Rep. of Germany | 105/3 |
| 3912383 | 6/1990 | Fed. Rep. of Germany | 280/446.1 |
| 1305153 | 8/1962 | France | 180/235 |

Primary Examiner—Mitchell J. Hill
Attorney, Agent, or Firm—Ladas & Parry

[57] ABSTRACT

An articulation damping device having a hydraulic piston-cylinder unit 2, connected pivotally at 5 to a front vehicle 3 at a distance y from the longitudinal median plane and on the other side and symmetrically thereto and also at the distance y from the longitudinal median plane a hydraulic piston-cylinder unit 19, is also pivotally connected at 5'. At their other ends the two units 2, and 19, 19' are connected to the outer part 1' of the turntable joint at pivot 4 located in the longitudinal median plane. In this position of the piston-cylinder units the vehicles of the articulated omnibus are aligned in an in-line position for running straight ahead. Dimension x deontes the distance of the points 5 and 5' of articulation from the pivot 4 in the longitudinal median plane. The dimension $b_{min}$ represents the inner dead center position of the piston-cylinder unit 2, dimension a denotes the radius of the turntable joint, $\beta$ denotes the articulation angle between the front vehicle 3 and the rear vehicle 6. The angle $\gamma$ is the angle between a line extending from the point 5 or 5' to the center point of the turntable joint. If the rear vehicle 6 is swung to the left (clockwise) the hydraulic piston-cylinder units 2, and 19, 19' pivot counterclockwise around respective pivots 5, the stroke of the unit 2, being decreased up to point A and the stroke of the unit 19, being increased up to point A by equal amounts. At positions past A there is an addition of the damping moments of the units 2 and 19.

13 Claims, 5 Drawing Sheets

DAMPING ARRANGEMENT FOR THE JOINT OF AN ARTICULATED OMNIBUS

BACKGROUND OF THE INVENTION

The invention relates to an articulation damping device for use in an articulated omnibus comprising a front vehicle and a rear or trailing vehicle connected with the front vehicle by means of a turntable joint and at least two hydraulic cylinders or shock absorbers arranged between the two vehicles.

Such an articulation damping device is described in the earlier German patent application P 39 12 383.9-21 and its U.S. counterpart Ser. No. 07/492,764. By means of this device it is possible to produce a characteristic of the damping moment, in accordance with which a damping moment is built up even at a minimum departure from the straight ahead alignment of the vehicles and such moment increases sinusoidally with an increase in the angle of articulation or buckling.

SUMMARY OF THE INVENTION

One object of the invention is to provide an articulation damping device which makes it possible to produce the known characteristic with simpler means and therefore at a lower price.

In order to achieve this or other object, in the invention the hydraulic cylinders or shock absorbers arranged between the front vehicle and the rear vehicle connected with an outer ring of the turntable joint or between the rear vehicle and the front vehicle connected with an inner ring of the turntable joint, have their one end articulated with the front vehicle or the rear vehicle on the two sides of the longitudinal median plane and at a distance apart and have their other ends articulated with the respective part of the turntable joint in or adjacent to the longitudinal median plane, at an acute angle to it and the inner dead center position of the respectively outwardly rocked hydraulic cylinder or shock absorber is only reached after a certain deflection of the articulation connections out of the longitudinal median plane. It is in this manner that it is possible for the two hydraulic cylinders or shock absorbers to have the same length, the same stroke and the same diameter so that both production and the storage of components become more efficient. During essentially straight ahead travel with only slight turning of the joint, both the hydraulic cylinders or shock absorbers have a speed of displacement and a lever arm directed towards the center of the rotary joint so that a corresponding damping torque becomes established. The increase in the damping moment with a change in the angle of articulation is generally sinusoidal. In accordance with a further possible development of the invention the two hydraulic cylinders or shock absorbers may be arranged in a horizontal plane, this making possible a low overall height and thus giving ample space for cables and other lines extending from the one vehicle to the other. By increasing the spacing between the pivot points of the hydraulic cylinders or shock absorbers on the front vehicle or rear vehicle it is possible to ensure larger damping torques, it then however being necessary to increase the stroke of the hydraulic cylinder or absorber. This possibility of varying the damping moment function may in certain cases be useful in order to adapt to particular conditions of use or to produce optimum results.

A further feature of the invention includes an adjustable choke valve in each branch of a connection line between the chambers of the hydraulic cylinder. It is in this manner that the damping moment may be altered and if necessary adapted to the different geographical or seasonal variations. It is also possible to provide a respective adjustable choke valve in each branch with a check valve in parallel therewith.

In accordance with a further development of the invention a plurality of choke valves, which are connected in parallel and have different choke cross sections, are arranged in one line, such different choke valves being able to be switched over to different ranges of angles of articulation. It is in this manner that particularly hazardous articulation angles may be substantially limited.

If a shut off valve is arranged in the hydraulic circuit, it is possible to ensure constant damping, which may be reset as desired without any upper limit thereto and which is produced by an associated relief pressure valve. This higher constant damping effect may prove necessary during, for instance movement out of a parking bay, or when driving conditions suddenly become hazardous, as for instance when the road is iced up. The switching on of the constant damping means may be either in accordance with the subjective opinion of the driver using a switch button, or automatically using an antiskid or antiwheellock system.

In accordance with the alternative possibility of using hydraulic cylinders it is possible to have shock absorbers whose absorbing effect varies with stroke.

The invention will now be described in more detail with reference to the accompanying drawings, which show one working embodiment thereof.

BRIEF DESCRIPTION OF THE SEVERAL FIGURES OF THE DRAWINGS

DETAILED DESCRIPTION OF WORKING EMBODIMENTS OF THE INVENTION

Figure 1:
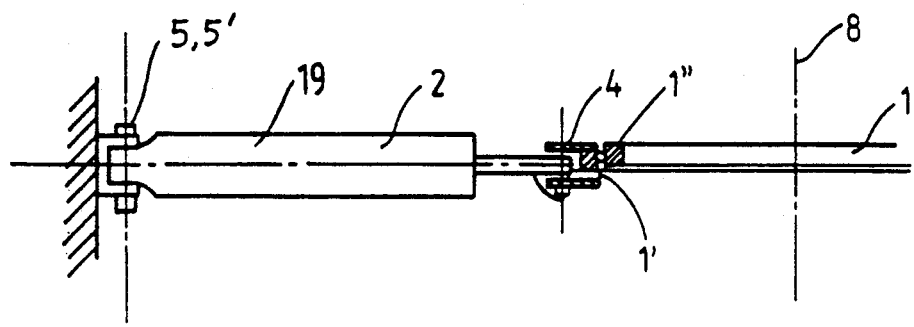
FIG. 1 shows one articulation damping device in accordance with the invention in side elevation.
Figure 2:
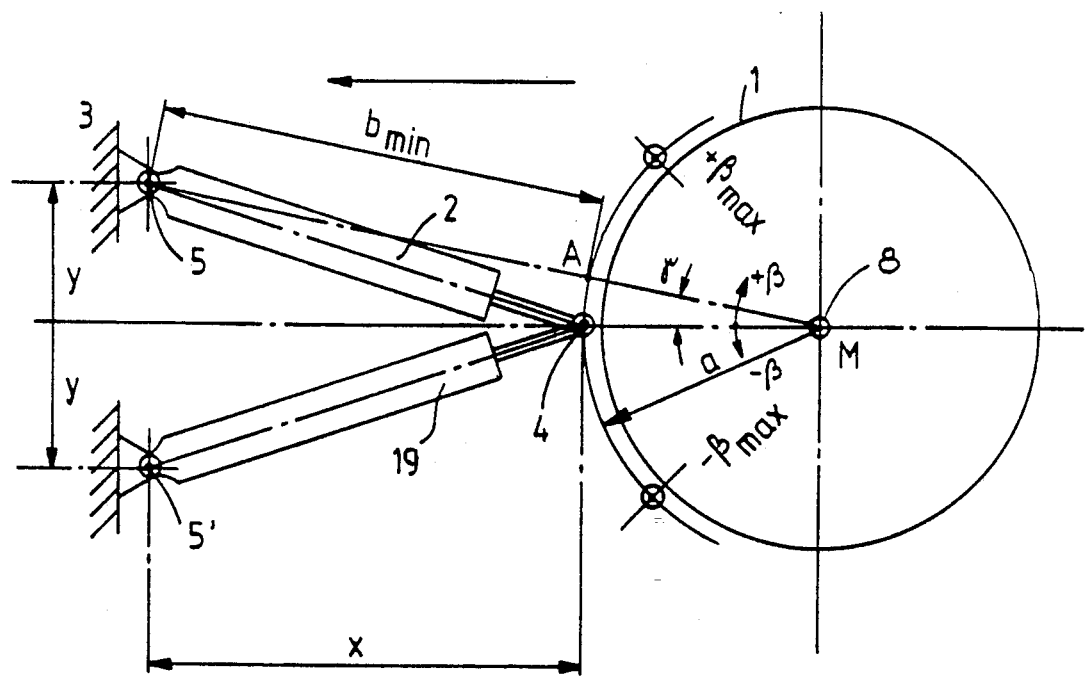
FIG. 2 shows an articulation damping device in plan view.
Figure 3:
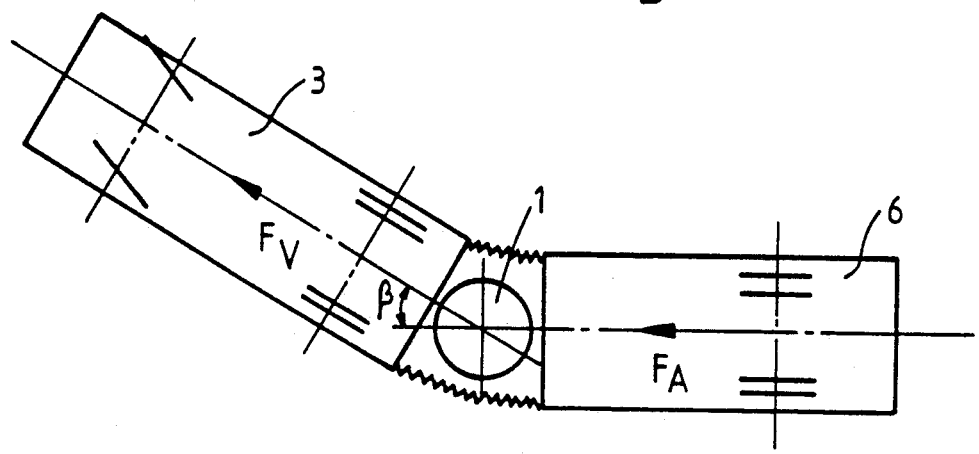
FIG. 3 is a diagrammatic representation of an articulated omnibus.

FIG. 3 shows an articulated omnibus with a front vehicle 3 and a rear vehicle 6, which are connected together by means of a turntable joint 1. As shown in FIGS. 1. The joint has outer and inner ring parts 1' and 1", respectively which are connected to respective vehicles and are relatively rotatable about articulation axis 8 and 2, there is an arrangement of a damping means for the joint 1 in accordance with the invention. On the front vehicle at the distance y from the longitudinal median plane a hydraulic piston-cylinder means 2 in the form of a hydraulic cylinder or a shock absorber at one of its ends is articulated at a first pivot the point 5 to vehicle 3. And symmetrically thereto but on the other side and also at the distance y from the longitudinal median plane a further hydraulic piston-cylinder means 19 is articulated at one of its ends at the point 5' to vehicle 3. At the other end the two hydraulic piston-cylinder means 2 and 19 are connected in an articulating manner in a plane perpendicular to the longitudinal median plane on the outer part 1' of the turntable joint at the second pivot point 4. This setting of the hydraulic piston-cylinder means 2 and 19 corresponds to straight ahead travel of the articulated omnibus with the vehicles 3 and 6 aligned in an in-line position. The dimension x denotes the distance of the pivot points 5 and 5' from the pivot point 4 in the longitudinal median plane and $b_{min}$ denotes the inner dead center position of the hydraulic piston-cylinder means 2 and 19. The dimension a denotes the radius of the turntable joint, $\beta$ denotes the buckle angle between the front vehicle 3 and the rear vehicle 6 and $\gamma$ denotes the angle between the straight line from the pivot point 5 or 5' to the center point of the turntable joint and the longitudinal median plane. If there is now a buckling articulation of the rear vehicle 6 to the left i.e. clockwise in FIG. 2 around articulation axis 8 of the joint, the hydraulic piston-cylinder means 2 and 19 and the will move to the right i.e. also clockwise in FIG. 2, the stroke of the hydraulic piston-cylinder means 2 being reduced as far as the point A and the stroke of the hydraulic piston-cylinder means 19 will be increased to the same degree as far as point A. At the point A the moment of the hydraulic piston-cylinder means 2 around the center of the joint is equal to zero. During movement past A there is then a summation of the moments of the cylinders 2 hydraulic piston-cylinder means 2 and 19.

The graph of the piston stroke is in accordance with the following equation:

$$H = \text{stroke} = \sqrt{[(x-a) - (a-\cos\beta)]^2 - [(a \cdot \sin\beta) - y]^2} - \sqrt{x^2 - y^2}$$

Figure 6:
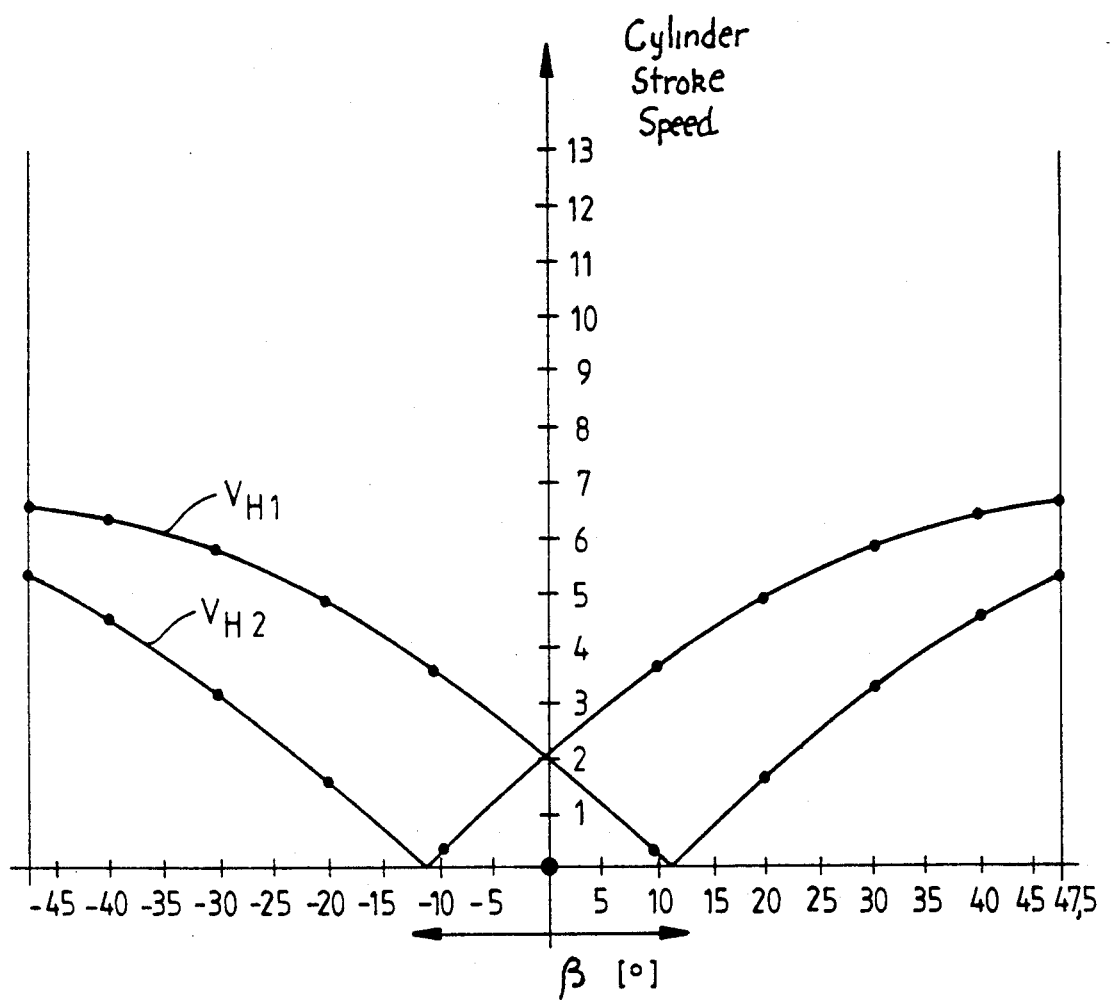
FIG. 6 shows a graph of the stroke speed plotted against articulation angle.
Figure 7:
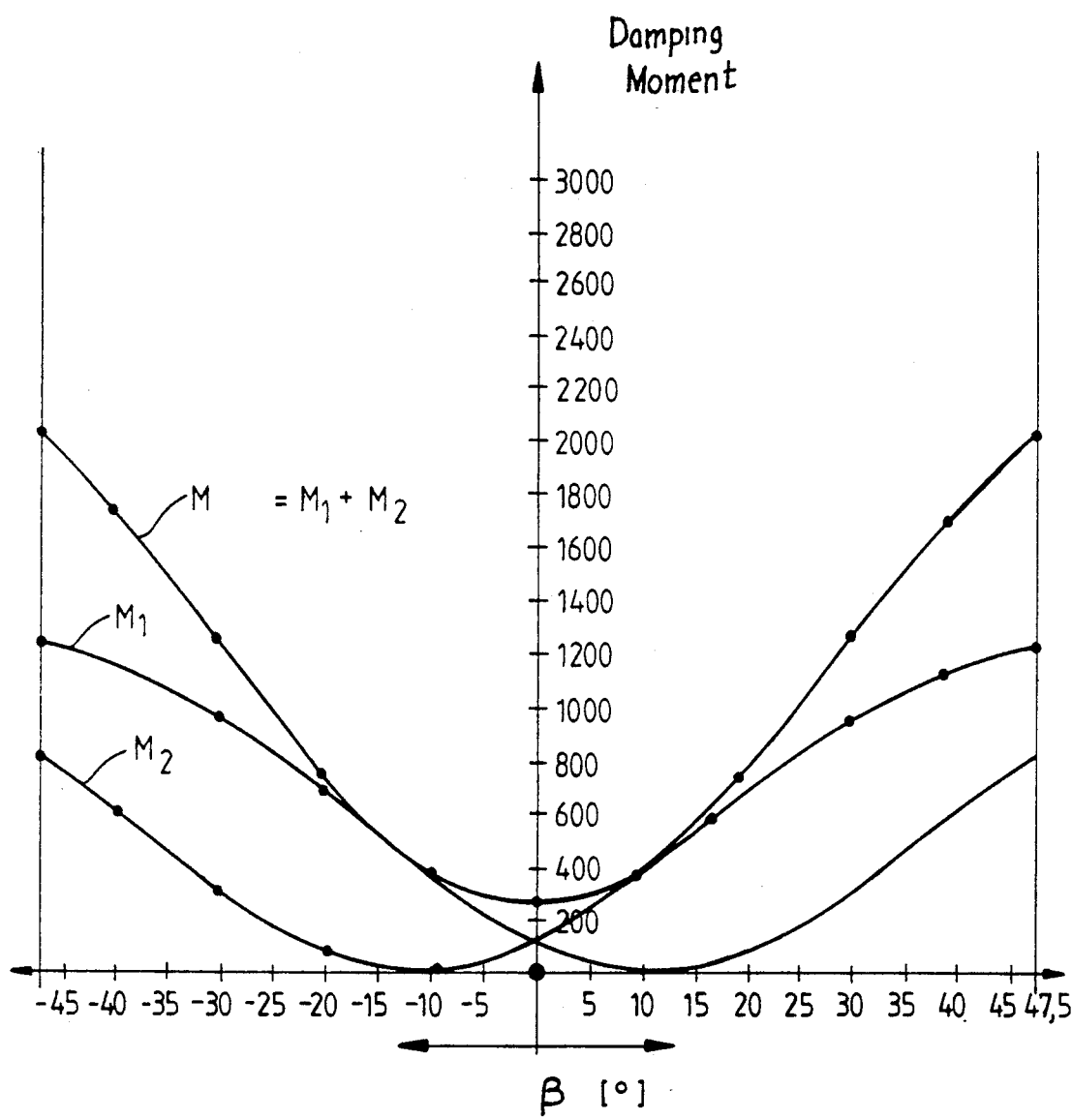
FIG. 7 is a graph of the damping moment plotted against articulation angle.

The stroke velocity graph of FIG. 6 corresponds to the following equation:

$$V_H = \text{stroke velocity} = \frac{\pi \cdot v_\beta \cdot 0.1 \cdot a[((x+a) - a \cdot \cos\beta) \cdot \sin\beta(a \cdot \sin\beta - y) \cdot \cos\beta]}{[180 \cdot \sqrt{[(x-a) - a \cdot \cos\beta]^2 + (a \cdot \sin\beta) - y)^2}]}$$

wherein $V_\beta$ denotes the buckling rate. In accordance with the formula $$M = D\text{-torque} = \left[\frac{V_{stroke} \cdot d(b_{min} + a)}{1000}\right] \cdot$$

$$\left[\frac{a \cdot \sin(\beta - \gamma)}{[(b_{min} + a) - (a \cdot \cos\beta - \gamma)]^2 + [a \cdot \sin(\beta \cdot \gamma)]^2}\right]$$

$$b_{min} = \sqrt{y^2 + (x+a)^2} - a$$

$$\gamma = \tan^{-1}(y/(x+a))$$

it is possible to plot the curves M1 and M2 of the moments and the wet moment curve $M_1 + M_2$ resulting therefrom as shown in FIG. 7. The wet moment curve shows an optimum form of the damping characteristic as is necessary for practical conditions, a moment being developed just after leaving the zero position which opposes any weaving or "wagging" of the vehicle and at greater buckle angles the wet moment progressively increases in a manner to produce damping which is commensurate with the buckling hazard.

Figure 4:
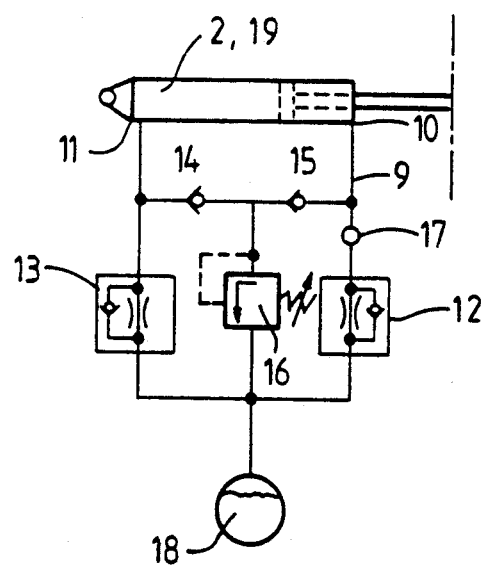
FIG. 4 is a schematic diagram of a hydraulic circuit schematic.
Figure 5:
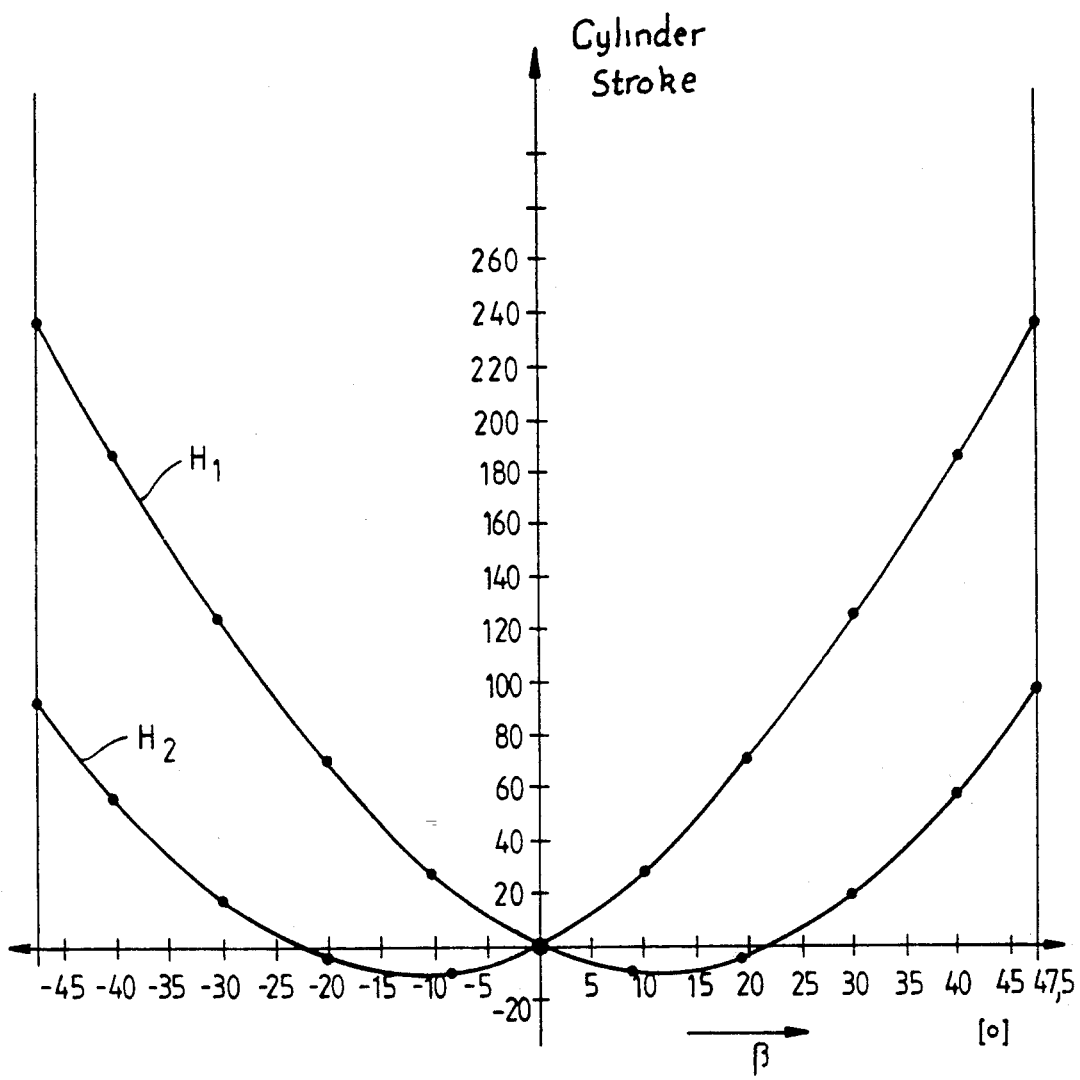
FIG. 5 shows a graph of cylinder stroke as a function of the articulation or buckling angle.

FIG. 4 shows a hydraulic schematic diagram with a cylinder 2 and 19 which at its ends has connections 10 and 11, which are connected by a line 9 to form a loop. In the line 9 there are choke valves 12 and 13 able to be reset on parallel connection branches of line 9. Each choke valve 12, 13 includes a parallel check valve. One branch at a time is able to be put into operation, since between the branch there shut off valves 14 and 15 arranged to open in opposite directions and between which a line extends, in which there is a relief valve 16. In order to allow for leakage and different stroke volumes a pressure accumulator 18 is arranged in the system. If choke valves 12 and 13 are included they may be used to modify a damping moment. With the aid of the shut off valve 17 it is possible to provide a constant damping effect which may be desired in various situations, the degree of such damping being able to be set by means of the relief valve 16. The shut off valve 17 may be operated manually by the driver in a hazardous situation using a suitable push button switch or automatically by an antiskid or antiwheellock system.

The above embodiments of the invention are described in as an individual arrangement, but however they may be embodied in the form of a redundant system, there then being either the advantage of slimmer cylinders or there is simply a redundant system, which is not able to fail during operation of the vehicle.

What is claimed is:

1. An articulated damping joint connecting front and rear vehicles of an omnibus for damped relative, rotation about an articulation axis of the joint, between an in-line position in which the vehicles are aligned in a longitudinal median plane and angulated positions of the vehicles, said joint comprising a turntable including inner and outer parts which are relatively rotatable around the articulation axis of the joint, the front and rear vehicles being respectively connected to said inner and outer parts for rotation therewith and a damping arrangement between one of said vehicles and one of said inner and outer parts, said damping arrangement comprising first and second hydraulic piston-cylinder means each having opposite first and second ends, first pivot means rotatably connecting said first and second hydraulic piston-cylinder means at respective said first ends thereof to said one vehicle on opposite sides of said longitudinal median plane at a transverse spacing therebetween, second pivot means connecting said first and second hydraulic piston-cylinder means at respective said second ends thereof to said one of said inner and outer parts for pivotal movement about a common point in proximity with said longitudinal median plane such that in said in-line position of the vehicles, said first and second hydraulic piston-cylinder means form acute angles with respect to said longitudinal median plane, said second pivot means undergoing angular displacement around said articulation axis from said longitudinal median plane, as said vehicles undergo relative angular displacement, to cause one of said first and second hydraulic piston-cylinder means to undergo contraction and approach a position in alignment with said articulation axis while the other hydraulic piston-cylinder means undergoes expansion and pivoting such that a net damping moment resisting relative rotation of said first and second parts of the joint progressively and continuously increases from an initial value of damping moment when the vehicles are in in-line position.

2. An articulated damping joint as claimed in claim 1, wherein said first and second hydraulic piston-cylinder means have the same length, the same stroke and the same diameter.

3. An articulated damping joint as claimed in claim 1, wherein said first and second hydraulic piston-cylinder means are symmetrically arranged around said longitudinal median plane in said in-line position.

4. An articulated damping joint as claimed in claim 1, wherein said first pivot means of said first and second hydraulic piston-cylinder means are symmetrically arranged around said longitudinal median plane.

5. An articulated damping joint as claimed in claim 1, wherein said first pivot means of said first and second hydraulic piston-cylinder means are symmetrically arranged in a vertical plane with respect to said longitudinal median plane.

6. An articulated damping joint as claimed in claim 5, wherein said first and second hydraulic piston-cylinder means are respectively arranged horizontally.

7. An articulated damping joint as claimed in claim 1, wherein each piston-cylinder means comprises a cylinder and a piston in said cylinder defining chambers therein on opposite sides of the piston, a connection line joining said chambers and a choke valve in said connection line.

8. An articulated damping joint as claimed in claim 7, wherein said connection line forms a loop between said chambers having a branch connected to each said chamber, one said choke valve being connected in each branch and a check valve being connected in each branch in parallel with the choke valve therein to block flow in the branch in the direction towards the other branch.

9. An articulated damping joint as claimed in claim 8, comprising a shut-off valve in one of said branches.

10. An articulated damping joint as claimed in claim 8, comprising a cross line connecting said branches and a relief valve connected to said cross line and to said connecting line at a point between said choke valves.

11. An articulated damping joint as claimed in claim 1, wherein said inner and outer parts of said turntable respectively comprise inner and outer rings.

12. An articulated damping joint as claimed in claim 1, wherein each of said first and second hydraulic piston-cylinder means has a damping characteristic which varies with stroke of a piston of the piston-cylinder means.

13. An articulated damping joint as claimed in claim 1, wherein in said in-line position of the vehicles, said first and second hydraulic piston-cylinder means extend from said second pivot means away from said turntable to their respective said second pivot means to form said acute angles with respect to said longitudinal median plane, each piston cylinder means being angulated to increase in its distance from the longitudinal median plane in the direction away from the turntable.

* * * * *

UNITED STATES PATENT AND TRADEMARK OFFICE
CERTIFICATE OF CORRECTION

PATENT NO. : 5,174,597
DATED      : December 29, 1992
INVENTOR(S): Josef Uttenthaler It is certified that error appears in the above-identified patent and that said Letters Patent is hereby corrected as shown below:

Title page: , Item 73 - Correct the printing of the
            Assignee name from:

"Man Nutzfahrzeuge A.G., Munich" to

"MAN Nutzfahrzeuge A.G., Munich"

Signed and Sealed this

Twenty-sixth Day of October, 1993

Attest:

BRUCE LEHMAN

Attesting Officer     Commissioner of Patents and Trademarks